Dec. 25, 1962    B. C. HUGHES    3,070,407
AIR BEARING
Filed May 16, 1961    2 Sheets-Sheet 1
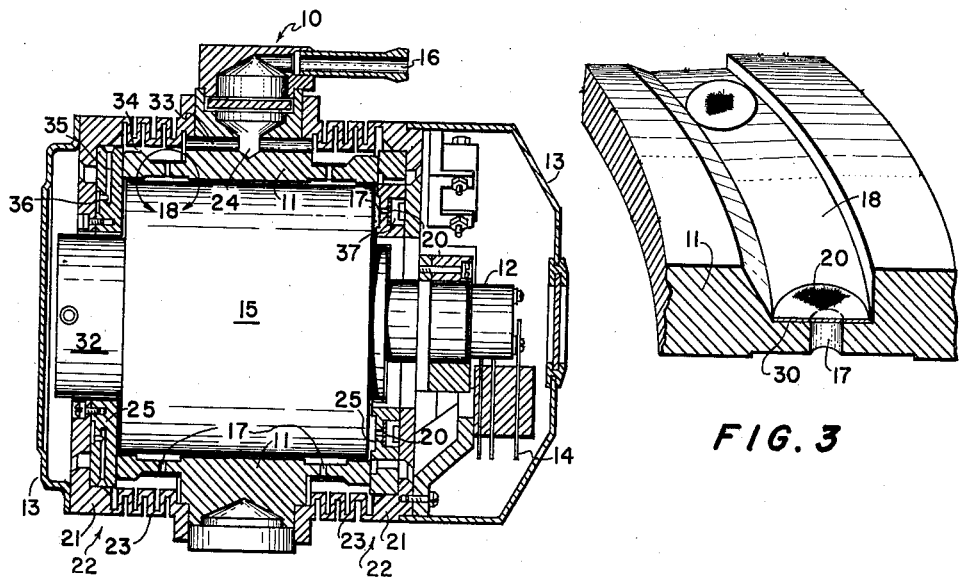
FIG. 1
FIG. 3
PRIOR ART
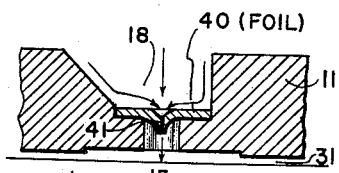
FIG. 4
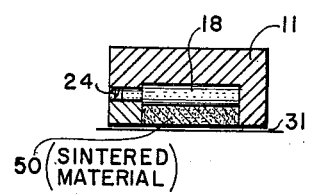
FIG. 5
INVENTOR.
BILLY C. HUGHES
BY
ATTORNEY Dec. 25, 1962        B. C. HUGHES           3,070,407
                      AIR BEARING
Filed May 16, 1961
                                          2 Sheets-Sheet 2

INVENTOR.
BILLY C. HUGHES
BY
ATTORNEYS

United States Patent Office 3,070,407
Patented Dec. 25, 1962

3,070,407
AIR BEARING
Billy C. Hughes, Huntsville, Ala., assignor to the United States of America as represented by the Administrator of the National Aeronautics and Space Administration
Filed May 16, 1961, Ser. No. 110,591
5 Claims. (Cl. 308—9)
(Granted under Title 35, U.S. Code (1952), sec. 266)

The invention described herein may be manufactured and used by or for the Government of the United States of America for governmental purposes without the payment of any royalties thereon or therefor.

This invention relates to an improved bearing in which a small volume of low pressurized air is employed as a lubricant between surfaces.

The improvement is particularly applicable to the bearings of gyros operating at high temperatures and in low fields of gravity, and where high dimensional stability is required, such as encountered in space flight vehicles.

The prior known systems provided for air bearings were subject to many disadvantages inherent in the means employed. The two most successful of these systems included, first, the provision of a plurality of small finite holes recessed in one of the bearing members and having a foil over the orifice with a highly precision punched hole therein to pass the correct amount of air. This device is, of course, subject to the disadvantage that it is difficult to manufacture with the precision necessary, and is subject to relatively large expansion and contraction at high and low operating temperatures. It is also subject to the creation of torque about the gyro gimbal bearing due to the highly restricted opening and the consequent highly defined jet characteristic of the resultant air stream. This is a particular manifestation when extremes of operating temperatures cause changes in the size or shape of the punched hole. In addition, this device is subject to both clogging by and failing to filter foreign matter, either of which conditions defeats its purpose. The second system provided a restriction, between the source of the pressurized air and the lubricating air film, with a "filter section" of a "porous" material, such as sintered metal, as disclosed in the Wilcox Patent Number 2,683,636, Causley Patent 2,665,960 and Becker Patent 2,645,534. Such devices are subject to the disadvantage that under the high temperatures and severe vibration conditions encountered in space vehicles, the filter materials and filters themselves are not stable, thus making them liable to structural failure and uneven expansion and contraction, as well as to breaking down internally, thereby changing the path of the air flow and creating torque, vibration and failure. In addition, such materials are relatively heavy and bulky and are not inherently clean, which are further distinct failings.

The present invention has, as its object, the elimination of thse disadvantages, and is particularly applicable to space vehicles, although not restricted thereto.

A more specific object is the provision of an improved air bearing system wherein the adverse effects of temperature variations and vibration are eliminated.

It is a further object of the invention to provide an improved air bearing which requires a lower volume of air.

A further object is the provision of an air bearing of increased efficiency wherein the load carrying capacity in acceleration and vibration for a given volume of air is increased.

It is a further object to provide an air bearing having an improved filter restrictor wherein the restrictor is spaced from the bearing surface.

Other objects and many attendant advantages of the present invention will be apparent from the following detailed description when taken together with the accompanying drawings in which:

FIGURE 1 is a sectional, elevational view of an air bearing device embodying the invention;

FIGURE 3 is a perspective view, partially in section, of the plenum, orifice and filter restrictor of FIGURE 2.

FIGURE 4 is a detail sectional view of the most successful prior art device; and FIGURE 5 is a detailed sectional view of a parallel surface type bearing of the prior art employing a central porous filter element.

Figure 2:
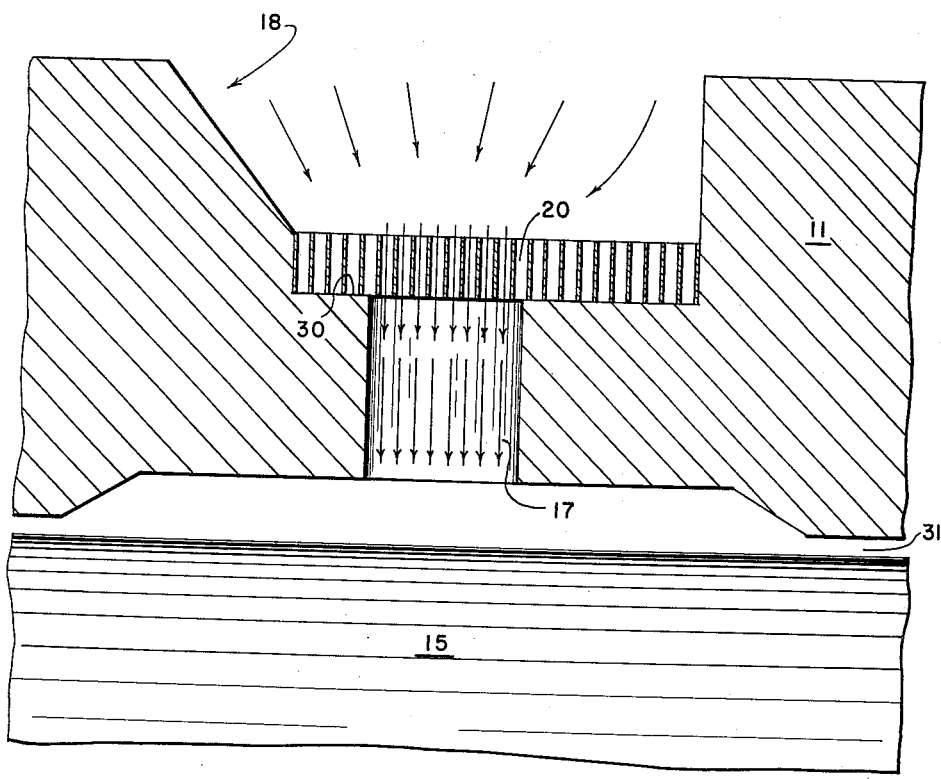
FIGURE 2 is a greatly enlarged detail of the air bearing surfaces as exemplified by the invention.

Referring to FIGURE 1, there is shown a conventional housing 10 for a gyro embodying the device of this invention. Such a housing comprises, essentially, a cylindrical sleeve 11 having removably attached thereto end assemblies 22, the end assemblies comprising closure plates 21 having relatively rigid bellows 23 integral therewith, which bellows permit the proper tensioning between the end assemblies and the sleeve, and end plates 25 positioned between each closure plate 21 and the sleeve element 11. On each end of the housing a dust cover 13 is removably secured to its corresponding end assembly 22. Inside the housing is mounted a conventional gyro enclosure 15 having shafts 12 and 32 extending outwardly therefrom, which shafts are journaled in and extend through the respective end assemblies 22. The shaft 12 is, of course, provided with leads 14 and the conventional electrical contacts (not shown) for the operation of the gyro and housing 15. Leading into the sleeve 11 from a compressed air source (not shown) is a feed line 16 which communicates with a distribution and bearing plenum feeder 24. From this feeder, the compressed air flows through the passage 33 to the plenum chambers 18, in the specific embodiment here shown as circumferential channels cast in the sleeve 11 (FIGURE 3), from which the air is fed (a) directly to the sleeve bearing feeder orifice 17 through the thin porous membrane 20 and, (b) through the communication channels 34, 35, 36 to the plenum chambers 37 in the end plates 25, which chambers are in offset relation to the communication channels 34, 35, 36, as best seen by a comparison of the left and right sides of the illustration of FIGURE 1, then through the porous membrane 20 and the feeder orifice 17. The filter restrictors 20 are cemented to the shoulders 30 surrounding the orifice 17 at the upstream face of the housing. From the feeder orifice 17 air enters the cavity housing the gyro enclosure 15 and acts as the lubricating film 31 between the gyro enclosure 15 and the sleeve 11 as best seen in FIGURE 2. The particular and new relationship of the plenum 18, the thin porous membrane 20 and air bearing feeder orifice 17 permits a relatively large percentage of air to be passed by the restrictor directly to the bearing space without turbulence producing structures or construction. This construction obtains the effective employment of substantially the entire orifice area, whereby a lower volume of air is required while obtaining an even, laminar flow. In the alternative, of course, the load carrying capacity of the bearing in acceleration and vibration for a fixed air consumption is increased.

In the prior art structure as exemplified by FIGURE 4, a foil 40 is provided with a highly precision punched hole 41 to pass the correct amount of air. It is obvious that a highly concentrated jet of air (as shown by the flow arrows) is thereby produced. The feeder orifice 41 is highly sensitive to changes in size due to the expansion and contraction of the foil during temperature variations. Such expansion and contraction changes the flow characteristics of the jet and is thus conducive to the creation of torque about the axis of the gyro enclosure 15. It is also subject to stoppage and failure by intrusion of foreign matter. The structure of the invention eliminates these difficulties since it reduces the velocity profile from a concentrated jet of air, as obtained by the FIGURE 4 device for example, to a more laminar flow, as well as being relatively insensitive to expansion, contraction and clogging, thus obviating the creation of torque or stoppage.

In the prior art device as exemplified by FIGURE 5, a porous sintered filter 50 is employed adjacent the air film 31. It is apparent that such a "filter" is highly sensitive to changes in air pressure as well as temperatures, and to failure due to changes in internal structure caused by pressure or temperature variations and vibration due to its physical make-up and relatively large size and mass. This is particularly apparent when the location of the filter is noted, since even the smallest change as a result of any of the conditions enumerated could cause a friction contact of the bearing surfaces, or permit the entry of foreign matter into the bearing surface. The present invention eliminates all of these failures by its positioning (spaced from the bearing surface), stability in conditions of pressure and temperature variation, filtering and restrictor action and inherent cleanliness.

A suitable membranous restrictor element for the practice of this invention is a thin cellulosic filter membrane having approximately 50,000,000 capillary pores of uniform dimensions per square centimeter of filter surface, the pores occupying approximately 80 to 85% of the total volume, or a monofilament nylon reinforced form, the pores in both instances being in the 3.0 micron to 100 millimicron range. Both filters are commercially available from the Millipore Filter Corp. under the trade names Millipore Filter or Millipore Microweb, and designated HA, SS for the Filter and SW for the Microweb. It is necessary that the restrictor employed be extremely light in weight, thin, stable at both low (i.e. in the order of −65° F.) and elevated (to 392° F.) operating temperatures dimensionally, of high porosity and filtering characteristics, and not subject to deformation or breakdown by variant stresses under vibration.

Thus, a highly satisfactory, thin, porous membrane material has been provided in combination with finite orifices for an air bearing, which combination is seen to be most highly critical when it is employed in high precision gyros whose tolerances are in the order of 0.000025 inch and wherein the stability of the component parts must be highly uniform. The torques produced under flight and acceleration loads in such a gyro must be under five tenths dyne/cm. Under these conditions, it is critical that the air bearing surface be free of all foreign matter, including hydrocarbons and water, and that the air supply be relatively small and free of turbulence.

Thus, it is apparent that the structure disclosed has accomplished each desirable objective, and has eliminated or obviated the disadvantages of the prior art.

Obviously, many modifications and variations of the present invention are possible in the light of the above teachings. It is, therefore, to be understood that within the scope of the appended claims the invention may be practiced other than as specifically described.

What is claimed is:

1. A fluid bearing comprising first and second opposed bearing elements having provisions for a lubricating film therebetween, said first bearing element having a bearing face and an upstream face spaced therefrom, and means for supplying a lubricating film between said bearing elements including a depression in said upstream face forming a plenum in communication with a source of pressurized fluid; small finite feeder orifices intercommunicating said faces, said feeder orifices providing communication between a source of pressurized fluid and said lubricating film, and a thin, lightweight, highly porous, dimensionally stable filter restrictor element secured in said plenum and spanning the entrance to, and in direct contact with one end of, each said orifice, thereby positioning said restrictor in a recess spaced from said bearing face and eliminating torque producing influences.

2. The combination of claim 1 wherein said restrictor element comprises a cellulosic membrane having a pore size between 0.45 micron and 3.0 microns and pore to substance ratio is approximately four.

3. A bearing assembly for providing a substantially frictionless lubricating film between a support and a supported member movable relative thereto, comprising: a first bearing element and a second, opposed bearing element movable relative thereto; said first bearing element having a bearing face and a plenum spaced from said bearing face; a flow passage in said first bearing element extending from said bearing face to said plenum operative to establish flow communication therebetween; said plenum having cooperative means for flow communication with a source of pressurized fluid; and a thin, lightweight, highly porous restrictor element secured in said plenum and immediately adjacent to and bridging the entrance to said flow passage to control the pressure, flow characteristics and rate of flow of pressurized fluid through said flow passage and supply a thin uniform film of lubricating fluid between said bearing elements while substantially eliminating torque producing influences.

4. A bearing assembly as claimed in claim 3 in which the axis of the flow passage is substantially normal to said bearing face and said restrictor element is provided with a multiplicity of passages therethrough substantially parallel to the axis of said flow passage.

5. A bearing assembly as claimed in claim 4 in which said restrictor element is a multipore cellulosic membrane having a pore to substance ratio of approximately four.

References Cited in the file of this patent
UNITED STATES PATENTS
2,660,484     Gerard et al. _____ Nov. 24, 1953